United States Patent

[11] 3,529,502

[72] Inventors Alexander Krynytzky
West Seneca, New York;
Arthur K. Schott, Greensboro, North Carolina; Otto Hoffmann, Tonawanda Township, Erie County, New York
[21] Appl. No. 596,384
[22] Filed Nov. 14, 1966
[45] Patented Sept. 22, 1970
[73] Assignee Houdaille Industries Inc.
a corporation of Delaware

[54] PUNCHING MACHINE
11 Claims, 3 Drawing Figs.
[52] U.S. Cl. .................................................. 83/137,
83/380, 83/384, 83/390, 83/454, 83/461, 83/639
[51] Int. Cl. ........................................................ B26d 7/02,
B26d 5/42
[50] Field of Search ........................................... 83/454,
639, 461, 380, 630, 459, 384, 137, 902, 390, 374

[56] References Cited
UNITED STATES PATENTS

| | | | |
|---|---|---|---|
| 402,457 | 4/1889 | Kennedy ..................... | 83/639X |
| 986,809 | 3/1911 | Derbyshire et al. ........... | 83/639X |
| 2,278,713 | 4/1942 | Riddle ......................... | 83/380 |
| 2,532,672 | 12/1950 | Michael et al. ............... | 83/630X |
| 2,642,138 | 6/1953 | Macewka ..................... | 83/639X |
| 2,758,649 | 8/1956 | Anderson et al. ............. | 83/630X |
| 2,825,404 | 3/1958 | Barley ......................... | 83/639X |
| 3,107,567 | 10/1963 | Lindner ........................ | 83/639X |
| 3,279,292 | 10/1966 | Beard .......................... | 83/380 |

*Primary Examiner*—Andrew R. Juhasz
*Attorney*—Hill, Sherman, Meroni, Gross and Simpson

ABSTRACT: A heavy duty punch press has a C-frame, whose upper arm supports a power-head module including a ram driven by an actuator through a toggle link. A fixed holder slidably supports an annular hold down member which in turn slidably supports a tool assembly which is reciprocated by the ram. A clamping actuator and return springs reciprocate the hold down member but under the control of the ram.

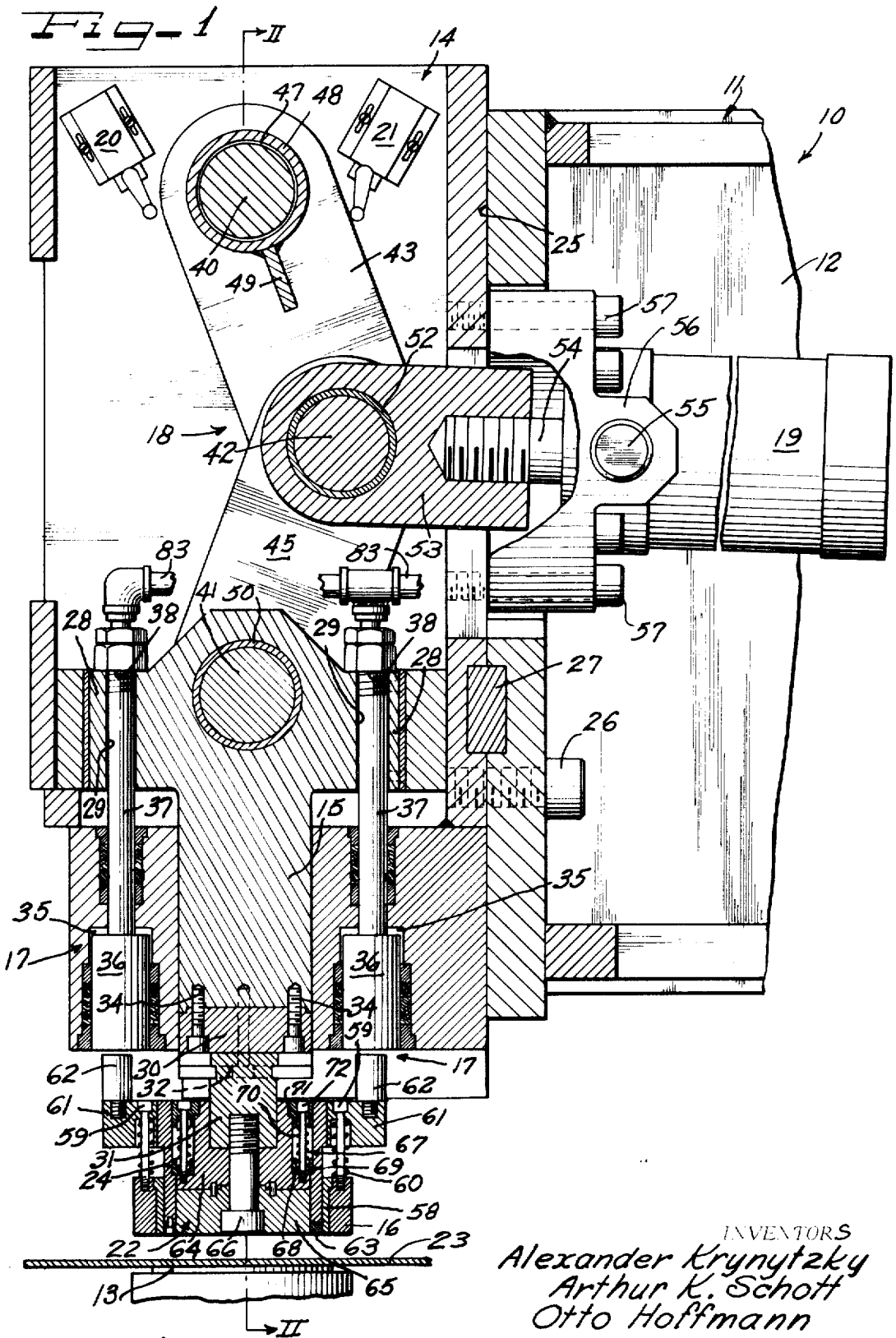

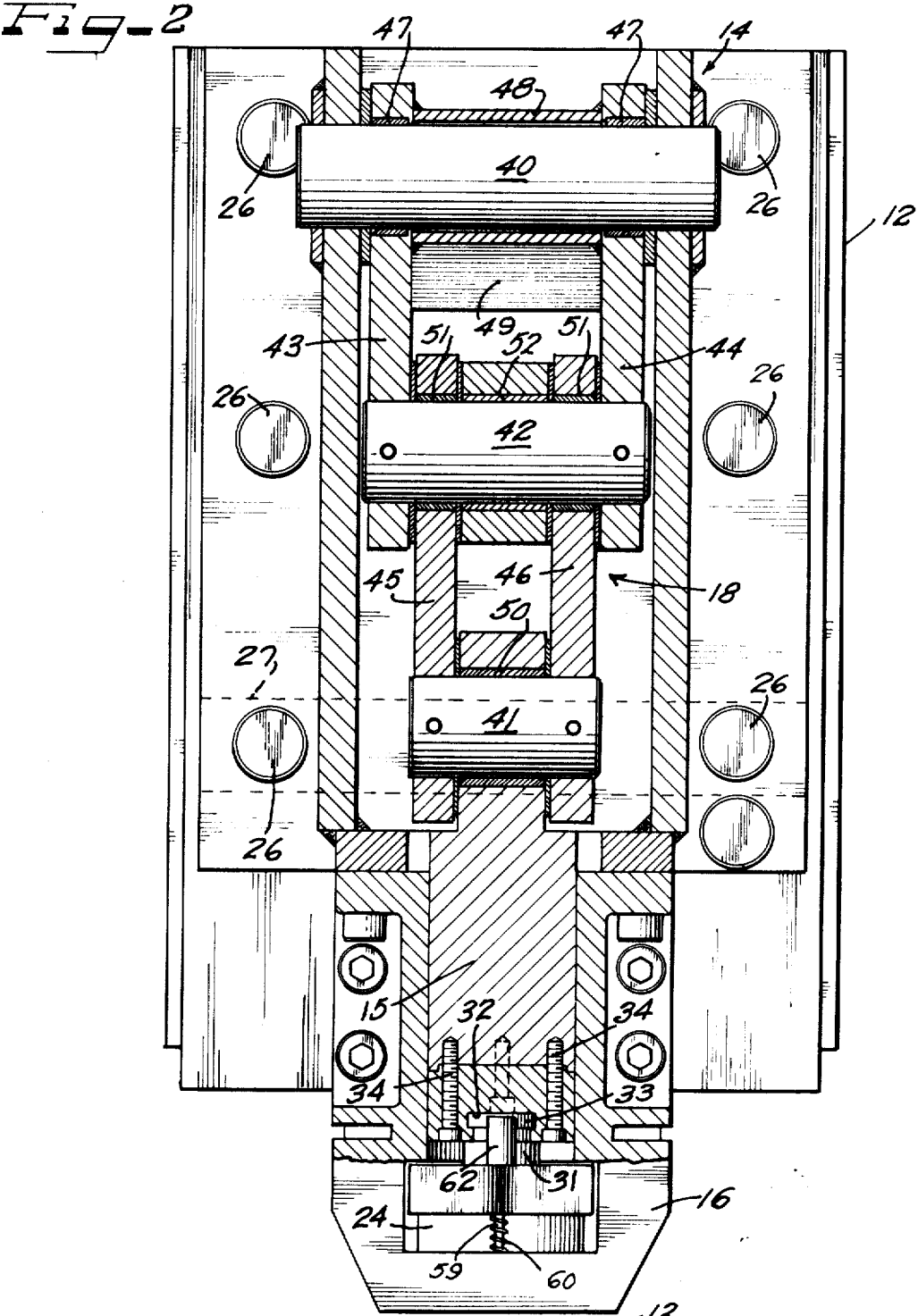

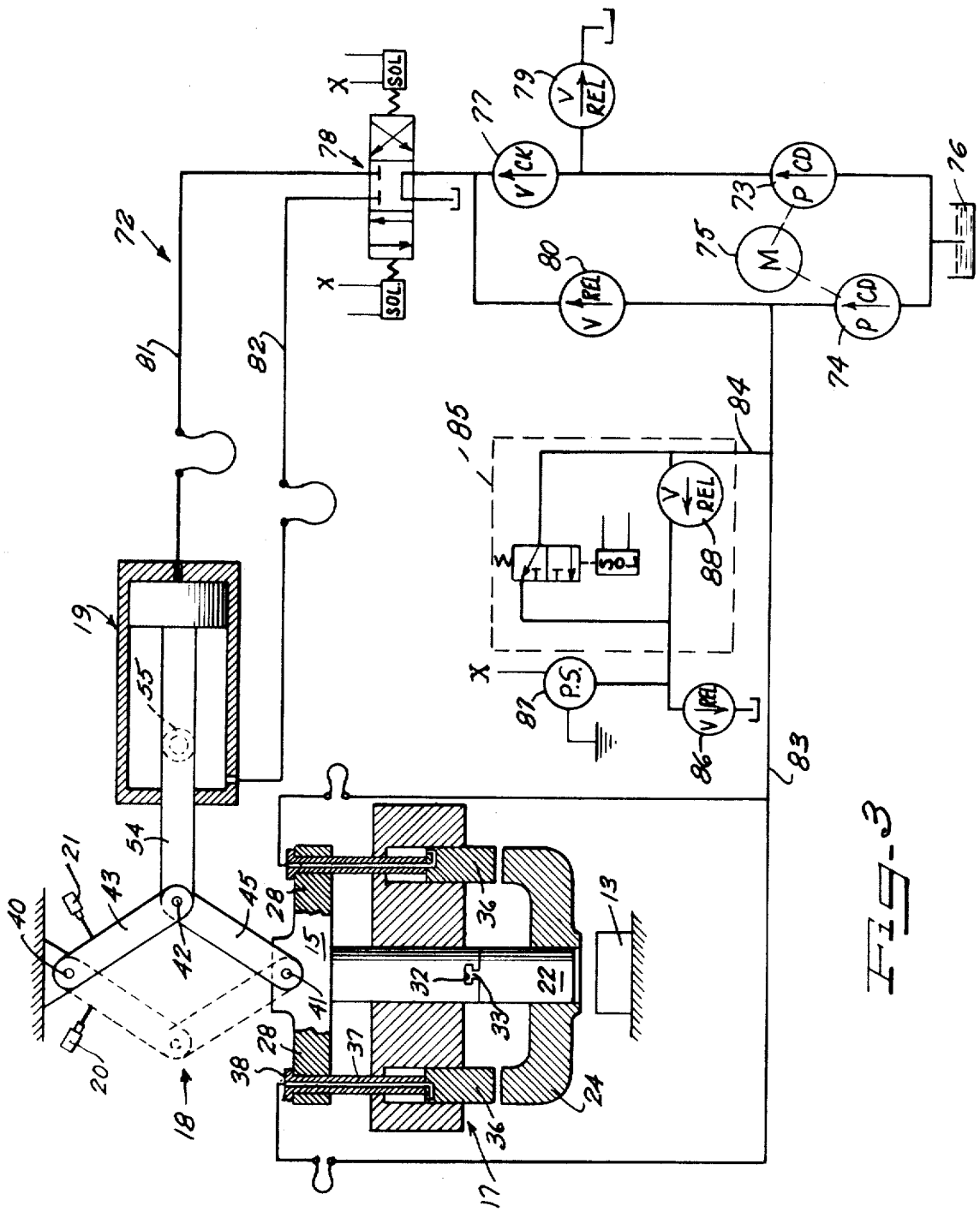

3,529,502

PUNCHING MACHINE

This invention relates generally to punching machines, and more specifically the invention relates to a heavy duty punch press.

The present invention relates to novel features and novel combinations of features which enable the punching of workpieces of relatively great thickness, whereby high punching and stripping forces are required. To that end, a novel drive system is provided which includes means for holding the workpiece during punching thereof, and during the stripping of the workpiece from the punch. Accordingly, it is an object of the present invention to provide a heavy duty punching machine.

A further object of the present invention is to provide a power head assembly for reciprocating a tool, which power head assembly comprises a structural unit or module.

A still further object of the present invention is to provide means for reciprocating a punch tool while avoiding lengthy drive structures, such means being able to be inched or jogged in small increments if desired.

A still further object of the present invention is to provide a punching machine having adjustable capacity and thereby having overload protection.

A still further object of the present invention is to provide structure for positively stripping a workpiece from the punch of a high tonnage rating.

Yet another object of the present invention is to provide a punching machine wherein the amount of space between the punch and the die when the punch is retracted can be adjusted.

A still further object of the present invention is to provide a hydraulic operating system by which the magnitude of holding and stripping forces applied to the workpiece is in accordance with the need in any particular stroke.

Yet another object of the present invention is to provide a punching machine wherein the movable tool is driven with a fast approach, is driven comparatively slowly during punching, has a fixed predetermined shut height, and wherein the movable tool is driven relatively rapidly during retraction or return.

Many other features, advantages and additional objects of the present invention will become manifest to those versed in the art upon making reference to the detailed description and to the accompanying sheets of drawings in which a preferred structural embodiment incorporating the principles of the present invention is shown by way of illustrative example.

ON THE DRAWINGS

FIG. 1 is a cross-sectional view taken in a vertical plane through the upper part or operating head of a punching machine provided in accordance with the principles of the present invention;

FIG. 2 is a cross-sectional view, partly in elevation, taken generally along line II—II of FIG. 1;

FIG. 3 is a schematic diagram of the fluid system employed with the structure of FIG. 1 which is also shown diagrammatically in this FIG.

AS SHOWN ON THE DRAWINGS

The principles of this invention are particularly useful when embodied in a punching machine such as is fragmentarily illustrated in FIG. 1, generally indicated by the numeral 10. The punching machine 10 includes a rigid frame 11 which, when viewed from the side, is of C-shaped configuration having an upper arm 12 and a lower arm (not shown) rigidly secured thereto which supports a lower fixed tool, here comprising a die tool 13. The upper arm 12 supports a rigid detachable head or module 14, which in turn slidably supports a ram 15, a removable upper tool holder 16, at least one and preferably a pair of clamping actuators 17,17, a toggle link or linkage 18, a fluid actuator 19, and a pair of electrical switches 20,21.

The ram 15 supports an upper movable tool, here comprising a punch tool 22 for coacting with the die 13 on a workpiece 23. The removable upper tool holder 16 supports a hold down member 24.

The frame 11 has a forwardly directed face 25 against which the detachable head 14 is secured as by a number of screws 26, proper registration being obtained by means of a key 27 acting between the upper arm 12 and the detachable head 14.

The ram 15 is slidably guided for vertical movement within the head 14 and includes a pair of ears 28,28, each of which is provided with an opening 29 which extends parallel to the direction of ram reciprocation. At its lower end, the ram 15 is provided with an adapter 30 which directly supports a head or driver 31 of the punch tool 22. In this embodiment, the adapter 30 and the punch head 31 are provided with a positive connection therebetween in the form of a horizontally extending T-slot and a T-head received therein, respectively indicated at 32 and 33 best seen in FIG. 2. The adapter 30 is secured by a number of screws 34,34 and thus may be readily replaced if desired.

The removable upper tool holder 16 is substantially the same as that shown in U.S. Pat. No. 3,225,636 to which the reader is referred for further structural information. As explained in that patent, the tool holder 16 hereof, which is only fragmentarily illustrated, may be manually released by actuation of means not shown and moved toward the viewer as seen in FIG. 2. Alternatively, either the left or the right side alone may be moved toward the viewer and thereby swung about the other side. The direction in which the horizontal T-slot 32 extends is such as to freely engage and disengage the positive connection 32,33 in response to removal or attachment of the upper tool holder 16.

If desired, other tool holders may be attached in place of the tool holder 16, for example tool holders of the type disclosed in the aforementioned patent.

The clamping actuators 17 respectively include a hollow cylinder 35 which comprises a cavity in the lower end of the detachable head 14, a piston 36, and a tubular rod 37 having a shoulder 38. The piston 36 is engaged by suitable seals of any known type acting between the piston 36 and the hollow cylinder 35. Similarly, the tubular rod 37 is engaged by other seals to prevent fluid leakage along the length of the rod 37. As shown in FIG. 3, the interior of the tubular rod 37 communicates with the interior of the hollow cylinder 35, which has no fluid port of itself. Thus, fluid pressure may be applied through the tubular rod 37 to act on one end, here the upper end, of the piston 36. The piston 36 includes means at one side, here the lower side, to act on the hold down member 24. In this embodiment, such means merely comprises a pushing surface, which may be of any convenient configuration. At the other side of the piston 36, means are provided to deliver power to the piston 36 from the ram for retraction of the piston 36. Such means comprises the tubular rod 37, the upper end of which not only is fluidly connected to the supply of pressurized fluid, but which supports the shoulder 38, here comprising an adjustably located pair of lock nuts.

The toggle link 18 is pivotally supported at its upper end by an upper pivot pin 40 carried by the head 14, while the ram 15 has a pivotal connection with a lower pivot pin 41 carried by the lower end of the toggle link 18. The toggle link 18 includes a central pin 42, secured to one of the links and supporting the other link. As best seen in FIG. 2, the upper link comprises a pair of spaced links 43,44, while the lower link comprises a pair of laterally spaced links 45,46. A bearing 47 is provided at each end of the upper pin 40 which is centrally enclosed by a housing 48. In this embodiment, a web 49 stiffens the assembly. The lower pin 41 is engaged by a bearing 50, while the central pin 42 is engaged by three bearings, 51,51, 52, the bearing 52 being disposed in an eye 53 secured by threads to the piston rod 54 of the hydraulic or fluid actuator 19.

The hydraulic actuator 19 at its rod end is provided with a trunnion 55 which is pivotally supported on a bracket 56 that is secured by a number of screws 57 to the removable head 14 or module. As the fluid actuator 19 is reciprocated from the position shown in solid lines in FIGS. 1 and 3 to the position shown in dashed lines in FIG. 3, the actuator 19 pivots when the links are aligned, the right end as illustrated going slightly up, the actuator going back to the position illustrated when the links have passed a like distance beyond the other side of center.

The switches 20,21 have actuators and are so disposed that the link 43 operates the switch 21 when the piston rod 54 is retracted, and operates the actuator of the switch 20 when the piston rod 54 is extended. The switches 20,21 may be of any known type and are adjustable so that the amount of travel of the piston rod 54 from a central position wherein the axes of the pins 40,41,42 are in alignment with each other, may be selected. To illustrate such adjustment, the switches have here been shown as having elongated slots. The switches 20,21 are connected electrically in the circuit that provides fluid power to the hydraulic actuator 19 to terminate the admission of further pressurized fluid thereto by opening the circuits to a four-way valve in the fluid system described below. As best seen in FIG. 1, the removable upper tool holder 16 has an opening concentric with the die 13 in which there is an insert 58 which is tubular in nature, and within which the hold down member 24 is disposed. The hold down member 24 is tubular and thus has an external surface that is guided by the insert 58 which is fixed with respect to the frame 11. The hold down member 24 has an annular shoulder at its upper end best seen in FIG. 2 through which there extends a number of screws 59 that are threaded into upwardly directed openings in the removable upper tool holder 16. A number of springs 60 act between the tool holder 16 and the hold down member 24, jointly tending to hold the hold down member 24 in the illustrated elevated position. The hold down member 24 has a lug or ear 61 at its front side and at its rear side which are aligned with the clamping actuators 17. In this embodiment, a pair of spacers 62,62 is employed to bridge the gap between the ears 61 and the lower end of the pistons 36. The lower end of the pistons 36 thus directly engage the spacers 62 to move the hold down member 24 downwardly against the force of the springs 60 to engage the workpiece 23, thereby clamping it against the die 13. If desired, and as shown, the lower end of the hold down member 24 may be provided with a hardened wear ring 63. When the clamping actuators 17 are retracted by the ram 15 as explained above, the springs 60 restore the hold down member 24 to the position illustrated.

The hold down member 24 has an internal surface which serves to guide the upper tool, in this case, the punch tool 22. The punch tool 22 includes the driver portion 31 described above, a punch body 64, and a punch tip 65. A screw 66 extends through the punch tip 65, through the punch body 64 and into the punch driver 61. Suitable keying is provided to orient the punch tip 65 with respect to the punch body in a known manner about a vertical axis. When the removable upper tool holder has been detached so as to disconnect the positive connection 32,33 between the punch 22 and the ram 15, there would be a tendency for the punch 22 to fall out downwardly but for the presence of a yieldable support means generally indicated at 67. The punch body 64 is slidably guided at its outer surface by the internal surface of the hold down member 24, and the outer surface of the punch body is undercut to receive a support member 68 which normally rests on a shoulder 69 on the internal surface of the hold down member 24. The support member 68 supports the lower end by resilient means, here comprising springs 70. The support member 68 and the springs 70 comprise the yieldable support means 67 which further includes a ring 71 through which a number of screws 72 pass and are threaded into the punch body 64. Thus the upper ends of the springs 70 act against the punch body while their lower ends act against the support member 68 which projects radially and is supported on the shoulder 69. The strength of the springs 70 is adequate to hold the punch 22 in the illustrated position even though the positive connection 32,33 may be disconnected. However, the springs 70 are relatively weak and would not serve as stripping devices. During punching, the support member 68 remains stationary relative to the hold down member while the punch 22 is moved downwardly against the force of the springs 70. The resistance to such movement of these springs is negligible.

The fluid system for the actuators 17,17, 19 is shown in FIG. 3, and is generally indicated by the numeral 72. In the illustrated form of the system 72, a pair of constant delivery hydraulic pumps 73,74 is driven by an electric motor 75. The pumps 73,74 have inlets connected to a sump 76 to which used fluid is returned or vented at various points diagrammatically illustrated. The pump 73 has a typical capacity of 37 gallons per minute, and its output is conducted through a check valve 77 to a three-position four-way valve 78. The four-way valve 78 is self centering, as by springs, and in the centered position, the entire output of the pump 73 is returned to the sump. Connected between the pump 73 and the check valve 77 is a relief valve 79 which typically is set to return fluid at 1,000 psi under conditions described below. The pump 74 has a typical capacity of 12 gallons per minute, and its outlet is connected through an in-line relief valve 80 to the inlet of the four-way valve 78.

The fluid actuator 19 is of the double-acting type, and has a typical piston diameter of 6". Opposite sides of its piston are connected by hydraulic lines 81,82 to the actuator ports of the four-way valve 78. A portion of each of the lines 81,82 comprises flexible hose which flexes in response to pivoting of the actuator 19 about the axis of its trunnion 55.

The pump 74 has its outlet also connected by a line 83 to the clamping actuators 17,17, and as the connection is made through the tubular rods 37 which move, the line 83 also includes flexible hose portions to accommodate such movement. The outlet of the pump 74 is also connected by a line 84 to an unloading valve 85. A typical unloading valve for this purpose is a Vickers C2—815—S3. In the drawing, an equivalent diagram has been provided to show that the unloading valve 85 normally conducts hydraulic fluid therethrough without appreciable resistance, the outlet thereof being connected through a relief valve 86 to the sump. The relief valve 86 has a typical cracking pressure of about 20 psi, and the presence of at least such pressure is sensed by an electrical pressure switch 87 which is electrically connected with the actuating solenoids of the four-way valve 78. Thus, the fluid actuator 19 and the ram 15 cannot be actuated unless fluid pressure is available to operate the clamping actuators 17. When the unloading valve 85 is electrically energized, which normally takes place simultaneously with energizing of one of the solenoids of the four-way valve 78, the low resistance path through the unloading valve 85 is blocked, thereby enabling fluid pressure to build up in the clamping actuators 17. The unloading valve 85 includes an adjustable relief valve portion indicated at 88 which typically would be set to relieve pressure at 2,000 psi, thereby adjusting the ultimate tonnage capacity of the press. For instance, if the punch 22 should jam, the maximum force that could be applied would be limited by the setting of the relief valve portion 88. If it is desired to set this valve below 1,000 psi, corresponding adjustment of the relief valve 79 is also required.

To operate the punching machine, the solenoid of the unloading valve 85 is energized along with one of the solenoids of the four-way valve 78. The pump 73 delivers fluid to one side of the fluid actuator 19, while the pump 74 supplies pressurized fluid to the clamping actuators 17. The clamping actuators 17 each have a typical piston diameter of 2 ⅜ inches, and the typical valves mentioned herein enable the punch ram 15 and the hold down member 24 to move downwardly together. However, it is preferred that the capacities, sizes, restrictions and the like in the system be such that firm clamping of the workpiece is obtained before the punch 22 engages the workpiece 23. As the hold down member 24 clamps against the workpiece 23, the line pressure builds up above the cracking pressure of the relief valve 80, thereby delivering fluid from both of the pumps 73, 74 to the fluid actuator 19 at a relatively fast rate, thereby building up a pressure in the fluid actuator 19 for effecting punching. In the event that the punching pressure exceeds the setting of the relief valve 79, further pressure increase is provided solely by the pump 74 so that a slower increase of pressure is provided immediately prior to punching. Upon completion of the actual punching, the pressure in the actuator 19 drops sharply, thereby reclosing the relief valve 79, whereupon both of the pumps 73,74 continue to deliver fluid to the fluid actuator 19 to drive it through center and to the other end of its travel as determined by the switch 20 or 21. As the toggle link 18 passes center, it begins to retract the ram while fluid pressure is still exerted on the hold down member 24. Subject to the pressure drop produced by the relief valve 80, the pressure in the fluid actuator 19 is substantially the same as that in the clamping actuators 17. If the workpiece produces a heavy drag on the punch 22 and resists being stripped from the punch 22, such condition will cause the pressure to build up in the actuator 19, and will cause a corresponding build-up of fluid pressure in the clamping actuators 17. Such pressure build-up increases until the necessary force is produced to strip the workpiece from the punch. After the stripping has been completed, the cross bar or ears 28 of the ram 15 will engage the abutments 38 on the clamping actuators 17 and will restore them, retract them or return them to the uppermost position, forcing fluid out of the clamping actuators. By this action, the fluid actuator 19 overpowers the fluid actuators 17. The system controls are so arranged that the solenoids that were energized will then be deenergized, and when the next punch signal is provided, the solenoid of the unloading valve 85 will be energized with the other of the solenoids of the four-way valve 78. This reverses the action of the fluid actuator 19, but the action of the ram 15 and the clamping actuators 17 will be the same. Thus, a complete punching cycle with the ram going down and going up is produced by each motion of the fluid actuator 19.

In the event that a conventional upper tool holder is employed in place of the tool holder 16, which does not have the hold down member 24, the downward movement of the clamping actuators 17 will be limited by the shoulders 38, and the fluid system would otherwise operate in the manner described. In such operation, the press ram 15 stores stripping energy in springs that form part of such other tool assembly in a conventional manner. However, the apparatus disclosed herein is particularly advantageous over such prior apparatus in that much higher holding and stripping forces can be developed than can be provided in the same space by such prior structures. By this change of structure, it has been possible to increase tonnage capacities of presses from 30-ton to 75-ton.

Although various minor modifications might be suggested by those versed in the art, it should be understood that we wish to embody within the scope of the patent warranted herein all such embodiments as reasonably and properly come within the scope of our contribution to the art.

We claim:

1. A punching machine, comprising in combination:
   a. a frame;
   b. a holder having an opening, said holder being rigidly secured to said frame;
   c. an annular hold down member reciprocably supported on said holder in said opening for clamping a workpiece against one of the tools;
   d. a reciprocably driven ram disposed above said holder and supported by said frame;
   e. a punch tool disposed within said annular hold down member and slidably guided thereby, and having a detachable driving connection with said ram; and
   f. at least one clamping actuator carried by said frame in normally vertically spaced relation to said hold down member and movable into engagement with said hold down member for applying driving power directly to said hold down member in one direction to effect said clamping.

2. A punching machine according to claim 1 having a oneway driving connection between said ram and said clamping actuator for positively driving said clamping actuator in a direction opposite to said one direction on the return stroke of said ram to the position where said clamping actuator is spaced from said hold down member.

3. A punching machine according to claim 2, including at least one spring acting between said holder and said hold down member for moving said hold down member in a direction opposite to said one direction in response to return of said clamping actuator.

4. A punching machine according to claim 1, said annular hold down member being tubular and having an external surface slidably guided by said holder, and having an internal surface for slidably guiding said punch tool.

5. A punching machine according to claim 4, including yieldable means acting between the body of said punch tool and said hold down member and being capable of supporting said punch tool at substantially the upper end of its travel while permitting said punch tool to be reciprocated.

6. A punching machine according to claim 5, said internal surface including an upwardly directed shoulder, and said yieldable means comprising a support member movably carried by said punch tool body and resting on said shoulder, and resilient means acting between said support member and said punch tool body and urging said punch tool body upwardly.

7. A punching machine according to claim 1, which includes:
   a. means acting between said frame and said holder and enabling removal of said holder in a horizontal direction;
   b. said punch having a body slidably guided by said hold down member; and
   c. a horizontal T-slot and T-head connection between said ram and said punch tool for effecting positive reciprocation of said punch tool, the slot of said connection extending primary in the direction in which said holder is removable.

8. A punching machine according to claim 1, in which said clamping actuator includes:
   a. means defining a hollow cylinder secured to said frame;
   b. a piston disposed in said cylinder and movable in one direction in response to fluid pressure acting against one end thereof;
   c. a spacer at one side of said piston for transmitting said driving power from said piston to said hold down member; and
   d. piston-return means slidably carried by said frame for transmitting power from said ram to the other side of said piston to move said piston in a direction opposite to said one direction.

9. A punching machine according to claim 8, in which said piston-return means for transmitting power from said ram to said piston comprises:
   a. a tubular rod connected at one end to said piston, slidably engaging said frame, and extending outwardly from said cylinder and through an opening in said ram;
   b. means defining a pressurizable fluid passage in said rod and arranged to be connected at one end to a supply of pressurized fluid, and opening at its other end into said cylinder at said one end of said piston; and
   c. a shoulder fixedly carried on said rod and disposed to be driven by said ram for a portion of its retractive movement.

10. A punching machine according to claim 1, which includes:
   a. a fluid actuator supported by said frame and connected to reciprocably drive said ram both upwardly and downwardly; and
   b. a system connected to supply pressurized fluid to said fluid actuator and to said clamping actuator, said actuators being so fluidly connected together in said system that increases in punching and stripping pressures in said fluid actuator during both upward and downward movement of the ram are accompanied by substantially corresponding increases in holding pressures in said clamping actuator.

11. A punching machine according to claim 2, which includes:
   a. a fluid actuator supported by said frame and connected to reciprocably drive said ram; and
   b. a system connected to supply pressurized fluid to said fluid actuator to drive it in both directions and connected to said clamping actuator to drive it in only the clamping direction, said system providing said fluid at such pressures as to enable said fluid actuator during its retraction of said ram to act through said one-way driving connection on said clamping actuator to overpower its clamping force for driving it in a return direction.